US008904963B2

(12) United States Patent
Dixon et al.

(10) Patent No.: US 8,904,963 B2
(45) Date of Patent: Dec. 9, 2014

(54) EXTRUDED ANIMAL LITTERS HAVING AN INCREASED ABSORPTION RATE

(75) Inventors: Dan Kenneth Dixon, St. Louis, MO (US); Nathan Foster Huck, Jackson, MO (US)

(73) Assignee: Nestec S.A., Vevey (CH)

( * ) Notice: Subject to any disclaimer, the term of this patent is extended or adjusted under 35 U.S.C. 154(b) by 299 days.

(21) Appl. No.: 12/931,247

(22) Filed: Jan. 27, 2011

(65) Prior Publication Data

US 2011/0185978 A1    Aug. 4, 2011

Related U.S. Application Data

(60) Provisional application No. 61/337,019, filed on Jan. 29, 2010, provisional application No. 61/339,262, filed on Mar. 2, 2010.

(51) Int. Cl.
*A01K 29/00* (2006.01)
*A01K 1/015* (2006.01)

(52) U.S. Cl.
CPC ............. *A01K 1/0154* (2013.01); *A01K 1/0155* (2013.01)
USPC ........................................................ 119/173

(58) Field of Classification Search
USPC .......................................... 119/171, 172, 173
See application file for complete search history.

(56) References Cited

U.S. PATENT DOCUMENTS

| | | | |
|---|---|---|---|
| 768,531 A | 8/1904 | Kirby | |
| 3,923,005 A * | 12/1975 | Fry et al. | 119/171 |
| 3,954,086 A | 5/1976 | Maness | |
| 4,206,718 A | 6/1980 | Brewer | |
| 4,873,811 A | 10/1989 | Izumitani et al. | |
| 4,881,490 A | 11/1989 | Ducharme et al. | |
| 4,929,474 A | 5/1990 | Avni et al. | |
| 4,949,672 A | 8/1990 | Ratcliff et al. | |
| 5,035,205 A | 7/1991 | Schiller et al. | |
| 5,293,837 A | 3/1994 | Caldwell | |
| 5,452,684 A * | 9/1995 | Elazier-Davis et al. | 119/173 |
| 5,577,463 A * | 11/1996 | Elazier-Davis et al. | 119/173 |
| 5,775,259 A * | 7/1998 | Tucker | 119/173 |
| 5,806,462 A | 9/1998 | Parr | |
| 5,860,391 A | 1/1999 | Maxwell et al. | |
| 5,901,661 A | 5/1999 | Patengill et al. | |
| 6,095,088 A | 8/2000 | Savicki | |
| 6,276,300 B1 | 8/2001 | Lewis, II et al. | |
| 6,287,550 B1 | 9/2001 | Trinh et al. | |
| 6,524,603 B1 | 2/2003 | Smith et al. | |
| 6,543,385 B2 | 4/2003 | Raymond et al. | |
| 6,578,521 B2 | 6/2003 | Raymond et al. | |
| 6,837,181 B2 | 1/2005 | Schulein, Jr. et al. | |
| 6,860,234 B2 | 3/2005 | Raymond et al. | |
| 6,887,570 B2 | 5/2005 | Greene et al. | |
| 6,955,136 B2 | 10/2005 | Schulein, Jr. | |
| 6,962,129 B1 | 11/2005 | Lawson | |
| 7,228,819 B1 | 6/2007 | Wang et al. | |
| 7,290,499 B2 | 11/2007 | Emery | |
| 7,316,201 B2 | 1/2008 | Rasner et al. | |
| 7,331,309 B2 | 2/2008 | Burckbuchler, Jr. | |
| 7,429,421 B2 | 9/2008 | Greene et al. | |
| 7,523,973 B2 | 4/2009 | Lin et al. | |
| 7,533,630 B2 | 5/2009 | Steckel et al. | |
| 7,603,964 B2 | 10/2009 | Jenkins et al. | |
| 7,628,118 B1 | 12/2009 | Nottingham et al. | |
| 7,757,638 B2 | 7/2010 | Wang et al. | |
| 7,895,976 B2 | 3/2011 | Ikegami et al. | |
| 8,074,604 B2 | 12/2011 | Swank | |
| 2004/0163604 A1 | 8/2004 | Kirk et al. | |
| 2005/0005869 A1 | 1/2005 | Fritter et al. | |
| 2005/0132968 A1 | 6/2005 | Swank | |
| 2006/0196438 A1 | 9/2006 | Caputa et al. | |
| 2007/0277740 A1 | 12/2007 | Delman et al. | |
| 2008/0087226 A1 | 4/2008 | Steckel et al. | |
| 2008/0223302 A1 | 9/2008 | Wang et al. | |
| 2009/0000560 A1 | 1/2009 | Matsuo et al. | |
| 2009/0000562 A1 | 1/2009 | Jenkins et al. | |
| 2009/0250014 A1 | 10/2009 | Juan | |
| 2009/0272327 A1 | 11/2009 | Plante | |
| 2009/0308323 A1 * | 12/2009 | Van Nieuwenhuijzen-Van Rooijen et al. ............... 119/173 |
| 2012/0012064 A1 | 1/2012 | Jenkins et al. | |

FOREIGN PATENT DOCUMENTS

WO    2009133212 A1    11/2009

OTHER PUBLICATIONS

Carrion et al., Animal Feed Science and Technology 165 (2011) 79-84.
Carvalho et al., Animal Feed Science and Technology 119 (2005) 171-178.
Sundu et al., Worlds Poultry Science Journal 62(2) (2006) 316-325.
Fu, Qingwei, "Preparation and Study on the Performances of Starch-based Biodegradable Foams," Tianjin University, China Master's Theses Full-text Database, Jan. 2007 (Engish translation).

* cited by examiner

*Primary Examiner* — Monica Williams
(74) *Attorney, Agent, or Firm* — Julie M. Lappin

(57) ABSTRACT

The invention provides animal litters that have an increased absorption rate and methods of making and using such litters. The animal litters comprise one or more animal litter particles that have been produced by fragmenting extruded animal litter particles that have a film on the surface of the particle that adversely affects the absorption rate. The fragmenting exposes the interior of the extruded animal litter particles, which does not have this film, to the external environment and increases the absorption rate.

22 Claims, No Drawings

EXTRUDED ANIMAL LITTERS HAVING AN INCREASED ABSORPTION RATE

CROSS REFERENCE TO RELATED APPLICATIONS

This application claims priority to U.S. Provisional Application Ser. No. 61/337,019 filed Jan. 29, 2010 and to U.S. Provisional Application Ser. No. 61/339,262 filed Mar. 2, 2010, the disclosures of which are incorporated herein by this reference.

BACKGROUND OF THE INVENTION

1. Field of the Invention

The invention relates generally to animal litters and particularly to extruded animal litters having an increased absorption rate.

2. Description of Related Art

Extruded animal litters are known in the art. U.S. Pat. No. 3,923,005 discloses an animal litter comprising alfalfa and starch that is made using an extrusion process. U.S. Pat. No. 4,206,718 discloses a process for producing light weight animal litter from ground alfalfa and gelatinisable flour or starch. In one embodiment, the litters contain up to 10% bentonite as a binder. U.S. Pat. No. 5,452,684 and U.S. Pat. No. 5,577,463 disclose an animal litter comprising an extruded smectite clay that forms stronger clumps when wetted with animal urine. U.S. Pat. No. 7,603,964 discloses mixing a clay materials and a light-weighting material and forming the mixture into a composite particle using various methods such as agglomeration, compaction, and extrusion. WO2009133212A1 discloses methods for producing low-density agglomerated pet litters using minerals with an attapulgite content greater than 50% and an extrusion process. U.S. provisional patent application 61/337,019 discloses an extruded animal litter made from clay and starch.

Generally, these extruded litters perform well for their intended purpose, e.g., absorbing liquid animal waste such as urine. However, many of the extruded animal litters, particularly those made from clay and starch, have a "film" on the surface of the litter particles. While this film is useful for various purposes, e.g., reducing the dust created while using the litter, it often adversely affects the absorption rate of the litter. There is, therefore, a need for methods for increasing the absorption rate of extruded animal litters and new extruded animal litters having an increased absorption rate.

SUMMARY OF THE INVENTION

It is, therefore, an object of the invention to provide extruded animal litters having an increased absorption rate.

It is another object of the invention to provide methods for making extruded animal litters having an increased absorption rate.

These and other objects are achieved using extruded animal litter particles that have been fragmented to expose the interior of the particles to the external environment. The interior portion of these extruded litter particles has the ability to absorb liquids such as animal urine or the moisture from animal feces or other wastes at an increased rate compared to the surface portion of the particles. Therefore, extruded animal litters having an increased absorption rate comprise these fragmented animal litter particles.

Additional and further objects, features, and advantages of the invention will be readily apparent to those skilled in the art.

DETAILED DESCRIPTION OF THE INVENTION

Definitions

The term "animal litter(s)" means a composition that is suitable for use as an animal litter (e.g., managing animal waste) but that can also be used for any other suitable purpose. For example, an animal litter of the invention could be used to absorb a chemical spill, absorb an oil spill, create traction on a slippery surface, and the like.

All percentages expressed herein relating to the components of a composition are by weight of the total weight of the composition unless expressed otherwise.

As used throughout, ranges are used herein in shorthand, so as to avoid having to set out at length and describe each and every value within the range. Any appropriate value within the range can be selected, where appropriate, as the upper value, lower value, or the terminus of the range.

As used herein and in the appended claims, the singular form of a word includes the plural, and vice versa, unless the context clearly dictates otherwise. Thus, the references "a", "an", and "the" are generally inclusive of the plurals of the respective terms. For example, reference to "a clay" or "a method" includes a plurality of such "clays" or "methods". Similarly, the words "comprise", "comprises", and "comprising" are to be interpreted inclusively rather than exclusively. Likewise the terms "include", "including" and "or" should all be construed to be inclusive, unless such a construction is clearly prohibited from the context. Where used herein the term "examples," particularly when followed by a listing of terms is merely exemplary and illustrative, and should not be deemed to be exclusive or comprehensive.

The methods and compositions and other advances disclosed here are not limited to particular methodology, protocols, and reagents described herein because, as the skilled artisan will appreciate, they may vary. Further, the terminology used herein is for the purpose of describing particular embodiments only, and is not intended to, and does not, limit the scope of that which is disclosed or claimed.

While not being bound by theory, it is believed that the extrusion process causes the starch to expand thus creating an expanded cellular structure in the litter with cells that are less dense than the clays alone. This decreases the density of the litter without adversely affecting the ability of the material to function as an animal litter. Further, the starch produces a composition that does not break apart to produce dust or clay fines, e.g., the starch produces a skin on the animal litter that maintains its integrity when handled and therefore does not produce small particles of the inventive animal litter.

The Invention

In one aspect, the invention provides animal litters having an increased absorption rate. The animal litters comprise one or more animal litter particles that have been produced by fragmenting at least one extruded animal litter particle that has a film on the surface of the extruded animal litter particle. The invention is based upon the discovery that typical extruded animal litter particles have a "film" on the surface of the particles that adversely affects the absorption properties of the litter, e.g., decreases the absorption rate, and that fragmenting the litter particles to expose the interior of the particles to the external environment increases the absorption rate. This surface film adversely affects the absorption properties of the particles by decreasing the permeability of the particles to liquids such as urine, e.g., liquids are absorbed at a slower rate than they would be if there was no film on the surface of the particles. However, the interior portion of the particles does not have this film. Therefore, the interior of the particles have the ability to absorb liquids at an increased rate compared to that of the surface of the particles.

While not being bound by theory, it is believed that the heat and friction formed at the surface of the extruded animal litter particles when they contact the extruder equipment changes the surface properties of the particles by forming a "film" at the surface of the particles. Generally, the extruded litter particles have an expanded cellular structure as noted above. Many of the "cells" at the surface of the particles are at least partially sealed or blocked by the changes in cellular structure caused by the heat and friction resulting from contact between the litter composition and the extruder components, i.e., these surface cells have a relatively closed structure compared to cells that do not contact the extruder equipment. Apparently, the heat and friction at the surface of the particles alters the physical properties of the cells at the surface, i.e., the cells at the surface not as permeable as the more typical cells in the interior of the particles. These less permeable cells are responsible for the "film" that affects permeability and absorption rates.

Fragmenting (by cutting, crushing, breaking, or otherwise) a litter particle into two particles creates a larger surface area for absorption when compared to the original litter particle alone. To illustrate, an ideal animal litter particle is a cylinder. The cylinder has a surface area of $2\pi R^2 + 2\pi RH$ where $\pi$ is 3.14, R is the radius of the cylinder, and H is the height or length of the cylinder. An idealized single cut of the particle produces two cylindrical litter particles. The total surface area of the two particles is always greater than the surface of the original particle. How much the surface area increases depends on the size of the particle, i.e., the radius and the height. One would expect the absorption rate of the two litter particles formed by fragmenting a single litter particle to be directly proportional to the increase in surface area obtained by fragmenting the original particle into two particles. However, the fragmented litter particles of the present invention have an absorption rate that exceeds the absorption rate expected based on the increase in surface area caused by the fragmentation. The theory is that the surface area created by the fragmentation does not have the film characteristic of the surface area of the unfragmented extruded litter particle. The surface area created by the fragmentation can therefore absorb liquids at a relatively increased rate.

The extruded animal litter particles are any extruded animal litter particles that have a film formed on the surface of the particles during the extrusion process that adversely affects the absorption rate. Such particles are typically formed when clays, starches, and other gelatinisable materials are components of the extruded litter, but other compounds can be responsible for the film. In one embodiment, the extruded animal litter particles comprises an extruded mixture comprising from about 10 to about 90% of or more clays and from about 90 to about 10% of one or more starches. Such litters are described in U.S. provisional patent application 61/337,019. In preferred embodiments, the clays are non-swelling clays, swelling clays, or combinations thereof and the starches are amylose, amylopectin, or combinations thereof.

The film on the surface of the extruded particles covers substantially the entire surface or only a part of the surface of the particles. Generally, any part of the surface that has the film will adversely affect the absorption rate for the particles. Typically, the film covers a significant portion of the surface of the particles. In various embodiments, the film substantially covers 10%, 20%, 30%, 40% 50%, 60%, 70%, 80%, 90%, or 100% of the surface of the particles. In preferred embodiments, the film covers at least 50% of the surface of the particles, most preferably at least 70%. In many embodiments, the film covers 90% or more of the surface of the particles.

As stated, the fragmented animal litter particles have an increase in surface area compared to the particles before they were fragmented. Generally, the animal litter particles have a surface area, that is at least 10% greater than the surface area of the extruded animal litter particles, preferably at least 30%, most preferably at least 50%. In some embodiments, fragmented animal litter particles have an increase in surface area compared to the particles before they were fragmented of at least 60%, 70%, 80%, 90%, 100%, or more. This is particularly true if an extruded animal litter particle is fragmented once to produce two particles and each of the resulting particles are fragmented again to produce four particles. Or, fragmented again to produce eight particles, etc.

In various embodiments, the litter comprising the animal litter particles produced by fragmenting extruded animal litter particles of the invention have a partial or complete coating of one or more swelling clays, preferably bentonite. Preferably, the swelling clay comprise from about 5 to about 40% of the litter.

In another aspect, the invention provides animal litters comprising a combination of an animal litter of the invention and one or more different compounds, compositions, or other materials that function as an animal litter. Such materials include extruded animal litters that have not been fragmented, conventional clay-based animal litters (clumping or non-clumping), corncobs, sawdust, wood, paper, silica gel (e.g., U.S. Pat. No. 6,860,234, U.S. Pat. No. 6,543,385, and U.S. Pat. No. 6,578,521), zeolites, sunflower seeds, and the like. Many such animal litters are known to skilled artisans. In a preferred embodiment, the material is a litter made from swelling clay, non-swelling clay, silica gel, or combination thereof. The animal litters of the invention can be combined with such other materials in any suitable amount to produce the combination. The combination is made by mixing the litter of the invention with the other materials. Generally, the animal litters of the invention comprise from about 5 to about 95% of the mixture, preferably from about 10 to about 90%, most preferably from about 20 to about 80%. In one embodiment, the mixture comprises about 50% of the animal litter of the present invention and about 50% of silica gel, clumping animal litter, non-clumping animal litter, or combination thereof. In another embodiment, the mixture comprises about 90% of the animal litter of the present invention and about 10% silica gel. In a further embodiment, the mixture comprises about 70% of the animal litter of the present invention and about 30% clumping litter.

In a further aspect, the invention provides methods for making animal litters. The methods comprise fragmenting extruded animal litter particles that have a film on their surface into two or more animal litter particles. The resulting particles have at least a portion of the interior of the particles exposed to the external environment. The interior of the particles do not have the film discussed herein that adversely affects absorption. Therefore, the resulting litter particles will have an increased absorption rate compared to the animal litter particles that have not been fragmented.

The extruded animal litter particles that have a film on their surface are produced using common extrusion equipment and methods known to skilled artisans. Suitable extruders and related equipment are commercially available and known in the art. Typical extruders include single and twin-screw extruders sold by Wenger and similar manufactures. Extruders and their use for manufacturing foods, plastics, and numerous materials are known to skilled artisans, e.g., animal litter density, size, and image are all impacted by the set up of the equipment and processing conditions. Any extrusion feed rate compatible with the mixture and the equipment can be used. Generally, the mixture is fed through the extruder at a rate of from about 10 to about 40 pounds per minute, preferably from about 12 to about 30 pounds per minute. Suitable equipment and methods are known to skilled artisans; some are given in the patents and patent applications incorporated herein, e.g., 61/337,019.

The litter particles can be fragmented by any suitable means. For example, a blade, crusher, mill, roller, or other similar device can be used to fragment a litter particle into two or more particles. In a preferred embodiment, a litter particle is fragmented by crushing the particle to produce two or more particles, preferably a plurality of particles. In this embodiment, the litter particles are crushed by applying force to one or more points of the surface of the particle. The force makes one or more breaks in the litter particle, generally random breaks, and exposes the interior of the litter particle to the external environment. Generally, this embodiment results in particles that are irregular in shape and size but that have a significant portion of the interior of the extruded litter particles exposed to the external environment.

In one embodiment, the extruded animal litter particles are fragmented into two particles. In other embodiments, the particles are fragmented into more than two particles. In various embodiments, particles produced by a fragmentation are further fragmented to produce more particles.

Further, the animal litter particles produced by fragmenting the extruded animal litter particles have the same advantages as the original extruded animal litter particles, e.g., reduced density (See U.S. provisional patent application 61/337,019).

In another aspect, the invention provides animal litters made using the methods of the invention.

In another aspect, the invention provides an animal litter box comprising a device suitable for containing animal litter and suitable for use by an animal when excreting animal waste and one or more animal litters of the invention. The device is any device suitable for use by an animal and compatible with an animal litter of the invention. Many such devices are known in the art and available commercially, e.g., the litter boxes disclosed in US20090250014A1, US20090272327A1, US20090000560A1, US20070277740A1, U.S. Pat. No. 7,628,118, and the like.

In a further aspect, the invention provides kits suitable for containing animal litters useful for managing animal waste. The kits comprise in separate containers in a single package or in separate containers in a virtual package, as appropriate for the kit component, an animal litter of invention and one or more of (1) a device suitable for containing the litter and suitable for use by an animal when excreting animal waste, e.g., a litter box; (2) a device suitable for handling animal waste that has been deposited with the litter, e.g., a scoop for removing animal feces from a litter (e.g., U.S. Pat. No. 7,523, 973) or a rake suitable for arranging an animal litter in a litter box or other container; (3) a different animal litter, e.g., a different animal litter suitable for creating a mixture of the litter of the invention and such different animal litter; (4) instruction for how to use the litter to manage animal waste; and (5) instructions for how to dispose of the animal litter, e.g., how to dispose of the litter in an environmentally friendly manner, particularly after it has been used.

When the kit comprises a virtual package, the kit is limited to instructions in a virtual environment in combination with one or more physical kit components. The kits may contain the kit components in any of various combinations and/or mixtures. In one embodiment, the kit contains a package containing the litter and a scoop suitable for removing animal waste from the litter.

In another aspect, the invention provides packages comprising a material suitable for containing an animal litter of the present invention and a label affixed to the package containing a word or words, picture, design, acronym, slogan, phrase, or other device, or combination thereof, that indicates that the contents of the package contains an extruded animal litter of the present invention, e.g., information about the litter's increased absorption rate or other physical, functional, or related properties. Typically, such device comprises the words "extruded animal litter having an increased absorption rate" or "enhanced absorption rate" or an equivalent expression printed on the package. Any package or packaging material suitable for containing animal litters is useful in the invention, e.g., a bag, box, bottle, can, pouch, and the like manufactured from paper, plastic, foil, metal, and the like.

In another aspect, the invention provides a means for communicating information about or instructions for using an animal litter of the present invention for one or more of (1) managing animal waste such as animal urine and feces; (2) controlling odor; (3) controlling moisture; (4) controlling microorganisms; and (5) controlling absorption rates. The means comprises a document, digital storage media, optical storage media, audio presentation, or visual display containing the information or instructions. In certain embodiments, the communication means is a displayed website, a visual display kiosk, a brochure, a product label, a package insert, an advertisement, a handout, a public announcement, an audiotape, a videotape, a DVD, a CD-ROM, a computer readable chip, a computer readable card, a computer readable disk, a USB device, a FireWire device, a computer memory, and any combination thereof. Useful information includes one or more of (1) methods and techniques for training or adapting an animal to use the litter; (2) functional or other properties of an animal litter of the invention, particularly those relating to the absorption rate; and (3) contact information for to use by a consumer or others if there is a question about the litter and its use. Useful instructions include methods for cleaning and disposing of the litter. The communication means is useful for instructing on the benefits of using the present invention and communicating the approved methods for using the invention for an animal.

In another aspect, the invention provides methods for managing animal waste, particularly liquid waste. The methods comprise contacting the animal waste with an animal litter of the invention. Generally, the litter is placed in a litter box or other suitable container and the animal is allowed to deposit its waste (urine or feces, but preferably urine) so that it comes in contact with the litter. If desirable, the litter can be placed on contact with the waste after the waste is deposited, e.g., on a lawn.

EXAMPLES

The invention can be further illustrated by the following examples, although it will be understood that the examples are included merely for purposes of illustration and are not intended to limit the scope of the invention unless otherwise specifically indicated.

Example 1

Animal Litter Production Methodology

An animal litter was made by mixing 99.5 pounds of ground corn (starch content of about 65%) and 0.5 pounds of distilled monoglycerides, and 19 pounds of water in a paddle mixer. This mixture was then ground with a hammer mill through a 4/64" screen to reduce the particle size so that the mix could pass through the extruder die openings. The mixture was then fed at a rate of 14 pounds per minute into a twin screw extruder.

Water at 0.56 pounds/minute and steam at 0.42 pounds/minute were injected into the extruder. The extruder screw speed was set at 350 rpm. The pressure at the discharge head of the extruder was measured at 750 psi and the internal product temperature varied in the range 220 to 270° F. (104 to 132° C.). The molten mixture was then extruded through circular die openings and cut into pellets (particles) by blades that swept across the face of the dies. The resulting particles averaged 3/16 inch in diameter and 1/4 inch length before drying. A pneumatic system was used to convey the particles to a belt dryer. The dryer was set at 250° F. (121° C.) and the rate of the belt adjusted to allow a drying time of 3.6 minutes after which the product moisture dropped to 5%. Substantially all of the surface of the litter particles is covered by a film as described herein.

Example 2

Whole Particle Surface Area

To obtain a measure of the surface area (SA) the whole particle from Example 1, a random sample of 20 particles were taken. The Diameter (d) and Length (l) of each particle were measured with a digital micrometer (Mitutoyo "Quick Mini" Model # PK-0505). All dimensions were recorded in millimeters (mm). The mean diameter (4.68 mm) and length (5.46 mm) for the particles were determined and shown in Table 1 for Example 1. Since these particles were cylindrical, the surface area for each particle was calculated using the formula for a cylinder:

$$SA \text{ "Whole" Particle} = 2\pi r^2 + 2\pi r l$$

Where, r (radius)=½(d)
This represented the surface area of a whole particle. This is shown in Table 1 and was 115.45 mm² for the particles produced in Example 1.

Example 3

Available Surface Area Due to Fragmentation

To break the outer surface, each particle was cut cross-sectionally and parallel to the circular ends with a single blade utility knife. This added two circular surfaces after cutting. The combined surface area (SA) of the two particles produced by cutting was calculated using the following formula and the radius and length from Example 2:

$$SA \text{ of "Cut" Particle} = 4\pi r^2 + 2\pi r l$$

For the particles produced from the particles in Example 1, the surface area was 150.28 mm², as shown in Table 1. Further the increase in surface area of the two particles due to cutting compared to the uncut particle was expressed as a percentage using the equation below and shown in Table 1. For the particles from Example 1, this increase was 29.97%.

$$\% \text{ Increase in } SA = \frac{[(SA \text{ of "Cut" Particle}) - (SA \text{ of "Whole" Particle})]}{SA \text{ of "Whole" Particle}}$$

Example 4

Animal Litter Absorption Capacity for the Whole Particles

Forty (40) whole particles were placed into a four ounce size sample cup. Approximately 100 g of distilled water was accurately weighed and added to the particles. After soaking for 30 seconds, the excess water was decanted into a beaker and weighed. The mass of water absorbed by the 40 whole particles ($WP_{Absorption\ Capacity}$) was calculated by the equation:

$$WP_{Absorption\ Capacity} \text{ (g)} = [\text{Mass (g) of total water added}] - [\text{Mass (g) of excess water}]$$

This was repeated with 5 additional sets of 40 particles. The mean mass of water absorbed by the 6 sets was calculated (1.15 g) and shown in Table 2 for particles from Example 1.

Example 5

Animal Litter Absorption Capacity for the Fragmented Particles

Absorption Capacity of "cut" Particles ($CP_{Absorption\ Capacity}$) was determined following the procedure of Example 4 with particles from Example 1 that were sectioned as was described in Example 3. The mean $CP_{Absorption\ Capacity}$ (g) of 6 sets of measurements (2.14 g) for cut particles is shown in Table 2. Further this increased water absorption due to cutting of the particles was calculated and expressed as a percentage as follows:

$$\% \text{ Increase in Absorption of cut particles} = 100 \times \\ ((CP_{Absorption\ Capacity} \text{ (g)} - (WP_{Absorption\ Capacity} \text{ (g)})) / (WP_{Absorption\ Capacity} \text{ (g)}))$$

For cut particles created from the particles from Example 1, this was 86.21% and is shown in Table 2.

Example 6

Absorption Capacity for Fragmented Particles Predicted by Increase Surface Area

In Example 3, it was shown that by cutting the particles from Example 1, there was an increase in SA of 29.97%. In Example 4, it was shown that the $WP_{Absorption\ Capacity}$ of the whole particles from Example 1 was 1.15 g. Based on this, the "Predicted" $CP_{Absorption\ Capacity}$ equals the $WP_{Absorption\ Capacity} + (0.2997 \times WP_{Absorption\ Capacity})$. For cut particles created from the particles from Example 1, this "Predicted" $CP_{Absorption\ Capacity}$ is 1.49 g, as shown in Table 2. Further substituting the "Predicted" $CP_{Absorption\ capacity}$ for the measured $CP_{Absorption\ Capacity}$ and using equation in Example 5, the "Predicted" % Increase in Absorption of cut particles was calculated and show in Table 2 (29.97%).

Example 7

Animal Litter with Water and Other Liquids 119 pounds of animal litter particles were made using 99.5 pounds of ground corn, 0.5 pounds of distilled monoglycerides, 8 pounds of water, 9 pounds of glycerin, and 2 pounds of mineral oil and mixed in a paddle mixer. This mixture was then ground with a hammer mill through a 4/64" screen to reduce the particle size so that the mix could pass through the extruder die openings. The mixture was then fed at a rate of 14 pounds per minute into a twin screw extruder Additional water (0.28 pounds/minute) and steam at 0.42 pounds/minute were injected into the extruder. The extruder screw speed was set at 350 rpm. The pressure at the discharge head of the extruder was measured at 750 psi and the internal product temperature varied in the range 220 to 270° F. (104 to 132° C.). The molten mixture was then extruded through circular die openings and cut into particles by blades that swept across the face of the dies. The resulting particles averaged 3/16 inch in diameter and 1/4 inch length before drying. A pneumatic system was used to convey the particles to a belt dryer. The dryer was set at 250° F. (121° C.) and the rate of the belt adjusted to allow a drying time of 3.6 minutes after which the product moisture dropped to 5%.

The surface area of the "whole" particles was determined as in Example 2; and that of the cut particles as in Example 3. The results for particles from Example 7 are shown in Table 1. The $WP_{Absorption\ Capacity}$ for particles from Example 7 were determined as for Example 4; the $CP_{Absorption\ Capacity}$ as for Example 5; and the "Predicted" $CP_{Absorption\ Capacity}$ as for Example 6. The results for particles from Example 7 are shown in Table 2.

Example 8

Animal Litter with 27.8% Na-Bentonite and 27.8% Ca-Montmorillonite Clay

The procedure in Example 1 was repeated except that 30 pounds of Na-bentonite, 30 pounds of non-swelling clay (Ca-Montmorillonite Clay), and 39.5 pounds of corn were used instead of 99.5 pounds of corn.

The surface area of the "whole" particles was determined as in Example 2; and that of the cut particles as in Example 3. The results for particles from Example 8 are shown in Table 1. The $WP_{Absorption\ Capacity}$ for particles from Example 8 were determined as for Example 4; the $CP_{Absorption\ Capacity}$ as for Example 5; and, the "Predicted" $CP_{Absorption\ Capacity}$ as for Example 6. The results for particles from Example 8 are shown in Table 2.

Example 9

Animal Litter with 50.4% Na-Bentonite Plus Additional Liquids 119 pounds of animal litter were made according to Example 7 using 60 pounds of Na-bentonite, 39.5 pounds of corn, 0.5 pounds of distilled monoglycerides, 8 pounds of water, 9 pounds of glycerin, and 2 pounds of mineral oil.

The surface area of the "whole" particles was determined as in Example 2; and that of the cut particles as in Example 3. The results for particles from Example 9 are shown in Table 1. The $WP_{Absorption\ Capacity}$ for particles from Example 9 were determined as for Example 4; the $CP_{Absorption\ Capacity}$ as for Example 5; and the "Predicted" $CP_{Absorption\ Capacity}$ as for Example 6. The results for particles from Example 9 are shown in Table 2.

Example 10

Animal Litter with 33.6% Ca-Montmorillonite Plus Additional Liquids 119 pounds of animal litter were made according to Example 7 using 40 pounds of Ca-montmorilinite, 59.5 pounds of corn, 0.5 pounds of distilled monoglycerides, 8 pounds of water, 9 pounds of glycerin, and 2 pounds of mineral oil. The surface area of the "whole" particles was determined as in Example 2; and that of the cut particles as in Example 3. The results for particles from Example 9 are shown in Table 1. The $WP_{Absorption\ Capacity}$ for particles from Example 9 were determined as for Example 4; the $CP_{Absorption\ Capacity}$ as for Example 5; and the "Predicted" $CP_{Absorption\ Capacity}$ as for Example 6. The results for particles from Example 9 are shown in Table 2.

Referring to the Examples and the data in Table 1 and Table 2, it is clear that absorption rate for the extruded animal litters is significantly increased by fragmenting the extruded litter particles to expose the interior of the particles to the external environment. The absorption rate is at least twice what was predicted.

TABLE 1

Surface Area Data

| Example | Particle Diameter (mm) | Particle Radius (mm) | Particle Length (mm) | Whole Particle Surface Area (mm²) | Surface Area of Fragmented Particles (mm²) | % Increase in Surface Area for Fragmented Particles |
|---|---|---|---|---|---|---|
| 1 | 4.68 | 2.34 | 5.46 | 115.45 | 150.28 | 29.97% |
| 7 | 4.92 | 2.46 | 5.79 | 128.02 | 166.09 | 29.94% |
| 8 | 4.37 | 2.19 | 6.69 | 122.73 | 152.90 | 24.92% |
| 9 | 4.67 | 2.34 | 7.15 | 140.23 | 174.70 | 24.85% |
| 10 | 5.13 | 2.56 | 5.98 | 138.26 | 179.75 | 30.02% |

TABLE 2

Absorption Capacity Data

| Example | $WP_{Absorption\ Capacity}$ (g) | $CP_{Absorption\ Capacity}$ (g) | "Predicted" $CP_{Absorption\ Capacity}$ (g) | Absorption Increase (%) | "Predicted" Absorption Increase (%) |
|---|---|---|---|---|---|
| 1 | 1.15 | 2.14 | 1.49 | 86.21 | 29.97 |
| 7 | 1.09 | 1.97 | 1.42 | 80.43 | 29.94 |
| 8 | 1.06 | 1.66 | 1.32 | 56.85 | 24.92 |

TABLE 2-continued

Absorption Capacity Data

| Example | $WP_{Absorption\ Capacity}$ (g) | $CP_{Absorption\ Capacity}$ (g) | "Predicted" $CP_{Absorption\ Capacity}$ (g) | Absorption Increase (%) | "Predicted" Absorption Increase (%) |
|---|---|---|---|---|---|
| 9 | 1.21 | 2.00 | 1.51 | 64.79 | 24.85 |
| 10 | 1.20 | 2.11 | 1.56 | 75.21 | 30.02 |

In the specification, there have been disclosed typical preferred embodiments of the invention and, although specific terms are employed, they are used in a generic and descriptive sense only and not for purposes of limitation. Obviously many modifications and variations of the invention are possible in light of the above teachings. It is therefore to be understood that the invention may be practiced otherwise than as specifically described.

Unless defined otherwise, all technical and scientific terms and any acronyms used herein have the same meanings as commonly understood by one of ordinary skill in the art in the field of this invention. Although any compositions, methods, and means for communicating information similar or equivalent to those described herein can be used to practice this invention, the preferred compositions, methods, and means for communicating information are described herein.

All references cited above are incorporated herein by reference to the extent allowed by law. The discussion of those references is intended merely to summarize the assertions made by their authors. No admission is made that any reference (or a portion of any reference) is relevant prior art. Applicants reserve the right to challenge the accuracy and pertinence of any cited reference.

What is claimed is:

1. An animal litter having an increased absorption rate, the animal litter comprising: a particle including one or more clays and one or more starches, wherein the particle has an expanded cellular structure with
   (i) interior cells that are less dense than the clay(s) alone;
   (ii) a film comprising surface cells that have a relatively closed structure and are less permeable than the interior cells; and
   (iii) a fragmented surface region that is substantially free of the film and exposes the interior cells.

2. The animal litter of claim 1 wherein the expanded cellular structure includes from about 10 to about 90% of one or more clays and from about 90 to about 10% of one or more starches.

3. The animal litter of claim 2 wherein the clays are non-swelling clays, swelling clays, or combinations thereof.

4. The animal litter of claim 2 wherein the starches are amylose, amylopectin, or combinations thereof.

5. The animal litter of claim 1 wherein the particle has a surface area that is at least 10% greater than the surface area of an extruded animal litter particle lacking a fragmented surface region.

6. The animal litter of claim 1 wherein the particle has a surface area that is at least 30% greater than the surface area of an extruded animal litter particle lacking a fragmented surface region.

7. The animal litter of claim 1 wherein the particle has a surface area that is at least 50% greater than the surface area of an extruded animal litter particle lacking a fragmented surface region.

8. The animal litter of claim 1 wherein the animal litter particles further comprise a partial or complete coating of one or more swelling clays.

9. The animal litter of claim 8 wherein the swelling clay is bentonite.

10. The animal litter of claim 8 wherein the swelling clay comprises from about 5 to about 40% of the litter.

11. An animal litter comprising a combination of the animal litter of claim 1 and a different material capable of functioning as an animal litter.

12. The animal litter of claim 11 wherein the combination comprises from about 5 to about 95% of the animal litter of claim 1 and from 95 to about 5% of the different material.

13. The animal litter of claim 11 wherein the different material is a litter made from swelling clay, non-swelling clay, silica gel, or combination thereof.

14. A method for making an animal litter composition, the method comprising:
   forming a mixture comprising one or more clays and one or more starches;
   extruding the mixture to form a particle having an expanded cellular structure with (i) interior cells that are less dense than the clay(s) alone; and ii a film comprising surface cells that have a relatively closed structure and are less permeable than the interior cells; and
   fragmenting the particle to expose the interior cells.

15. The method of claim 14 wherein the particle is fragmented by one or more of cutting, crushing, or breaking.

16. The method of claim 14 wherein the film covers at least 10% of the surface prior to fragmenting.

17. The method of claim 14 wherein the film covers at least 50% of the surface prior to fragmenting.

18. The method of claim 14 wherein the film covers at least 70% of the surface prior to fragmenting.

19. The method of claim 14 wherein the film covers at least 90% of the surface prior to fragmenting.

20. The method of claim 14 wherein the particle has a surface area that is at least 10% greater after fragmenting.

21. The method of claim 14 wherein the particle has a surface area that is at least 30% greater after fragmenting.

22. The method of claim 14 wherein the particle has a surface area that is at least 50% greater after fragmenting.

* * * * *